US011928695B1

(12) United States Patent
Chng

(10) Patent No.: US 11,928,695 B1
(45) Date of Patent: Mar. 12, 2024

(54) ANTI-THEFT SMART RETAIL SHELF

(71) Applicant: DISA DIGITAL SAFETY PTE. LTD., Singapore (SG)

(72) Inventor: Weng Wah Chng, Singapore (SG)

(73) Assignee: DISA DIGITAL SAFETY PTE. LTD., Singapore (SG)

( * ) Notice: Subject to any disclaimer, the term of this patent is extended or adjusted under 35 U.S.C. 154(b) by 0 days.

(21) Appl. No.: 18/193,375

(22) Filed: Mar. 30, 2023

(30) Foreign Application Priority Data

Mar. 24, 2023 (SG) .......................... 10202300808U

(51) Int. Cl.
*H04N 23/66* (2023.01)
*G06Q 30/018* (2023.01)
*G08B 13/196* (2006.01)
*H04N 23/69* (2023.01)

(52) U.S. Cl.
CPC ....... *G06Q 30/0185* (2013.01); *G08B 13/196* (2013.01)

(58) Field of Classification Search
USPC ............................................ 386/248; 116/75
See application file for complete search history.

(56) References Cited

U.S. PATENT DOCUMENTS

| 6,854,815 B1* | 2/2005 | Smith ................... A47B 49/008 211/121 |
| 10,186,124 B1* | 1/2019 | Mullins ............ G08B 13/19682 |
| 2005/0222889 A1* | 10/2005 | Lai .......................... G06Q 10/06 705/7.41 |
| 2006/0041345 A1* | 2/2006 | Metcalf .............. B64D 45/0031 340/5.2 |
| 2006/0281435 A1* | 12/2006 | Shearer .............. G06K 19/0702 455/343.1 |
| 2009/0093361 A1* | 4/2009 | Sakatani ................ B01J 35/004 502/309 |
| 2017/0061095 A1* | 3/2017 | Waskin .............. G07C 9/00174 |
| 2018/0095138 A1* | 4/2018 | Newport .............. G06Q 10/087 |
| 2019/0172032 A1* | 6/2019 | Wang .................... G07F 11/004 |
| 2020/0193789 A1* | 6/2020 | Budano ............. G08B 13/2417 |
| 2021/0228915 A1* | 7/2021 | Schroder ................... A62B 1/10 |
| 2022/0381065 A1* | 12/2022 | Blanchard ........... E05B 73/0082 |
| 2022/0383714 A1* | 12/2022 | Wood ................. G07C 9/00896 |
| 2023/0153831 A1* | 5/2023 | Budano .............. G06K 7/10415 705/318 |
| 2023/0169813 A1* | 6/2023 | Fawcett .................... G07C 9/32 340/5.2 |

* cited by examiner

*Primary Examiner* — Nigar Chowdhury
(74) *Attorney, Agent, or Firm* — Sheppard, Mullin, Richter & Hampton LLP

(57) ABSTRACT

Embodiments of the disclosed technology provide anti-theft shelving units particularly designed to deter/detect sweeping theft. For example, an anti-theft shelving unit of the disclosed technology may comprise a combination of the following anti-sweeping theft design features: (1) flip-stopper(s) swingably-mounted to shelves of the anti-theft shelving unit; (2) flip-door(s) swingably-mounted to the anti-theft shelving unit; (3) processing circuitry that, in response to an anti-theft-related signal, locks the flip-stopper(s) and flip-door(s) in fixed positions that restrict access to items on the shelves; and (4) shelf-mounted sensors and processing circuitry that determine occurrence of sweeping theft in response to detecting removal of over a threshold number of items from a shelf in a pre-determined time interval.

20 Claims, 8 Drawing Sheets

ANTI-THEFT SMART RETAIL SHELF

TECHNICAL FIELD

This invention generally relates to anti-theft shelving systems and more specifically some embodiments relate to retail display systems designed for enhanced loss prevention.

DESCRIPTION OF RELATED ART

Retailers often stock merchandise on shelving units. The shelving units may comprise one or more shelves (i.e., horizontally-oriented or approximately horizontally-oriented planes into which merchandise can be placed). As used herein, a "shelf space" may refer to the open space above a shelf. For example, a shelving unit may comprise two shelves—a bottom shelf and a top shelf. The shelf space for the bottom shelf may be between an upwards-facing surface of the bottom shelf and a downwards-facing surface of the top shelf.

BRIEF SUMMARY OF THE DISCLOSURE

Various embodiments of the disclosed technology provide anti-theft shelving units. An anti-theft shelving unit of the disclosed technology may comprise: (1) a flip-stopper swingably-mounted to a shelf of the anti-theft shelving unit; (2) a non-transitory memory configured to store instructions; and (3) a processor configured to execute the instructions to perform operations of: (a) in response to an anti-theft-related signal, locking the flip-stopper in a fixed position extending upwards from the shelf such that access to an item on the shelf behind the flip-stopper is blocked or otherwise restricted.

The anti-theft shelving unit may further comprise a flip-door swingably-mounted to the anti-theft shelving unit. In these embodiments, the operations may further comprise, in response to the anti-theft-related signal, locking the flip-door in a closed position such that access to items on the shelf is restricted.

In some embodiments, the anti-theft-related signal may be generated by a remotely located device communicatively connected to the anti-theft shelving unit.

In certain embodiments, the anti-theft shelving unit may further comprise an array of sensors arranged on the shelf to detect removal of items from the shelf. In these embodiments, the operations may further comprise: (a) detecting, via the array of sensors, removal of items from the shelf; (b) based on the detected removal of items from the shelf, determining occurrence of sweeping theft; and (c) generating the anti-theft-related signal. In certain embodiments, determining the occurrence of sweeping theft based on the detected removal of items from the shelf may comprise: (i) detecting removal of over a threshold number of items in a pre-determined time interval; and (ii) based on detecting removal of over the threshold number of items in the pre-determined time interval, determining the occurrence of sweeping theft.

In some embodiments, the anti-theft shelving unit may further comprise a camera mounted to the anti-theft shelving unit. In these embodiments, the camera may be communicatively coupled to a video analytics system that analyzes video of the anti-theft shelving unit and generates the anti-theft-related signal. In some embodiments, the operations may further comprise: (a) analyzing video of the anti-theft shelving unit obtained by the camera; (b) based on analyzing the video, determining the occurrence of sweeping theft; and (c) generating the anti-theft-related signal.

In certain embodiments, the anti-theft shelving unit may further comprise an alarm buzzer mounted on the anti-theft shelving unit. In these embodiments, the instructions may further comprise, in response to the anti-theft-related signal, activating the alarm buzzer.

Another anti-theft shelving unit of the disclosed technology may comprise: (1) a flip-door swingably-mounted to the anti-sweeping theft shelving unit; (2) a non-transitory memory configured to store instructions; and (3) a processor configured to execute the instructions to perform operations of: (a) in response to an anti-theft-related signal, locking the flip-door in a closed position that restricts access to items on a shelf of the anti-theft shelving unit. In certain embodiments, the operations may further comprise: (i) detecting removal of over a threshold number of items from the shelf in a pre-determined time interval; (ii) based on detecting removal of over the threshold number of items in the pre-determined time interval, determining the occurrence of sweeping theft; and (iii) in response to determining the occurrence of sweeping theft, generating the anti-theft-related signal.

Some embodiments provide a method performable by an anti-theft shelving system. The method may comprise: (1) detecting, by the anti-theft shelving system, removal of over a threshold number of items from a shelf in a pre-determined time interval; (2) based on the detected removal of items from the shelf, determining, by the anti-theft shelving system, occurrence of sweeping theft; and (3) triggering, by the anti-theft shelving system, a sweeping-deterrence action.

In some embodiments, triggering the theft deterrence action may comprise triggering an alarm.

In certain embodiments, triggering the theft deterrence action may comprise triggering an anti-theft mode for a shelving unit associated with the shelf. When the shelving unit is in the anti-theft mode, a flip-stopper swingably-mounted to a shelf may be locked in a fixed position extending upwards from the shelf such that access to an item located behind the flip-stopper is restricted. By contrast, when the shelving unit is not in the anti-theft mode, the flip-stopper may be in a non-locked configuration that allows a user to swing/rotate the flip-stopper downwards to access the item located behind the flip-stopper.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
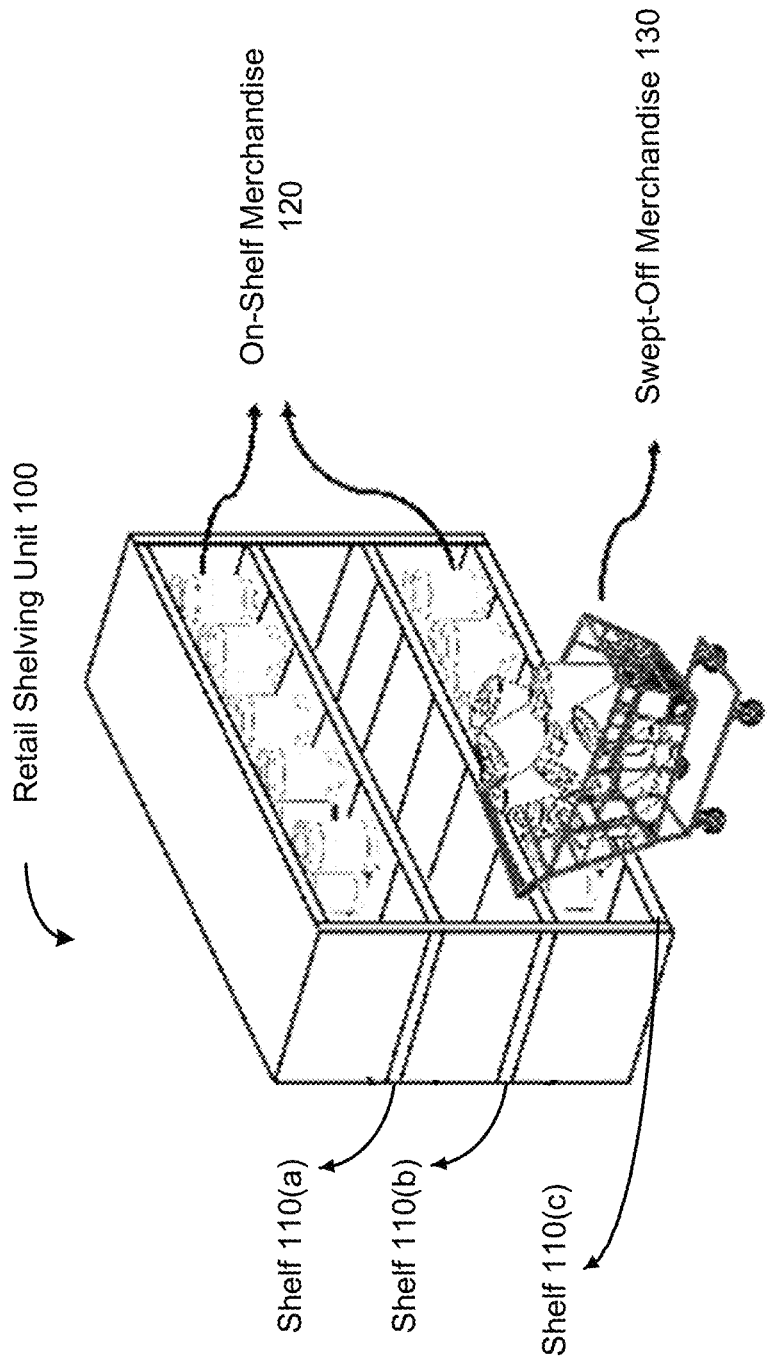
FIG. 1 depicts an example conventional retail shelving unit.

The figures are not exhaustive and do not limit the present disclosure to the precise form disclosed.

DETAILED DESCRIPTION

Theft is a major problem in the retail industry—causing significant monetary losses for retailers. "Sweeping theft" can be especially pernicious. Sweeping theft occurs when perpetrators steal multiple items in a single/related action (e.g., "sweeping" many closely-located items off a shelf into a shopping cart in a single action or in successive sweeping actions).

To compensate for theft-related losses, retailers typically hire additional security guards, increase the price of merchandise, or both. Even with these compensatory measures, which increase operational costs for retailers and increase prices for consumers, retailers can be forced to shut down stores due to rampant theft/rampant sweeping thefts.

Various attempts have been made to reduce the amount of inventory lost due to retail theft. For example, some existing retail display systems incorporate features designed to mitigate/deter theft, such as those referenced in U.S. Pat. No. 11,288,662, which is incorporated by reference herein in its entirety. However, embodiments of the systems and methods disclosed herein provide mechanisms for detecting a perpetrator "sweeping" multiple items off a shelf in a relatively quick period of time.

Accordingly, embodiments of the disclosed technology provide anti-theft shelving units and systems particularly designed to deter—and in some cases, detect—sweeping theft. For example, an anti-theft shelving unit of the disclosed technology may comprise any one or combination of the following anti-sweeping theft design features: (1) flip-stopper(s) swingably-mounted to shelves of the anti-theft shelving unit; (2) flip-door(s) swingably-mounted to the anti-theft shelving unit; (3) processing circuitry that, in response to an anti-theft-related signal, locks the flip-stopper(s) and flip-door(s) in fixed positions that restrict access to items on the shelves; and (4) shelf-mounted sensors and processing circuitry that determine occurrence of sweeping theft in response to detecting removal of over a threshold number of items from a shelf in a pre-determined time interval.

As described in greater detail below, the flip-stoppers and flip-doors of the disclosed technology are designed to deter/prevent a perpetrator from removing a large number of items from a shelf in a short time interval. Namely, these design features necessitate multiple steps (and in many cases, multiple hand movements) to access individual items on a shelf—thereby deterring/preventing a perpetrator from being able to remove multiple items off of a shelf in a "sweeping" action. Accordingly, the anti-theft shelving units of the disclosed technology can deter/prevent sweeping theft by their structural design alone.

However, the anti-theft shelving units may also include processing circuitry and motors that, in response to an anti-theft-related signal, automatically lock either or both of the above-described design features (i.e., flip-stoppers and flip-doors) in fixed positions designed to deter/prevent theft. For example, flip-stoppers may be locked in a fixed position extending upwards from an upwards-facing surface of a shelf thereby: (1) restricting access to individual items located behind the flip-stoppers; and (2) deterring "sweeping actions" that remove/sweep multiple items off the shelf in a short time interval. Relatedly, a flip-door may be locked in a closed position that restricts access to the shelf and the items located thereon.

As alluded to above, the anti-theft shelving units of the disclosed technology may also include shelf-mounted sensors that communicate with the processing circuitry to determine the occurrence of sweeping theft in response to detecting removal of over a threshold number of items from the shelf in a pre-determined time interval. That is, the processing circuitry may determine the occurrence of sweeping theft when the shelf-mounted sensors detect that a "relatively large number" of items (such a number can be custom-configurable based on application) have been removed from the shelf in a "short amount" of time (such a number can be custom-configurable based on application). Again, such a scenario is characteristic of sweeping theft where a perpetrator removes multiple items from a shelf in a short amount of time—often in a single "sweeping action" or multiple successive "sweeping" actions.

Details of embodiments of the above-referenced anti-sweeping theft design features (along with other anti-theft features), are described in greater detail in conjunction with the accompanying drawings.

FIG. 1 depicts an example conventional retail shelving unit 100. As depicted, retail shelving unit 100 includes three shelves: shelves 110(a)-(c). Each shelf may be a horizontally-oriented (or approximately horizontally-oriented (e.g., within 15% or within 20% of horizontal)) plane onto which items of merchandise (e.g., items of on-shelf merchandise 120) can be placed. Each shelf may additionally have an associated "shelf space." As alluded to above, a "shelf space" may refer to the open space above a shelf. For example, shelf 110(c) may have a shelf space bounded by the upwards-facing surface of shelf 110(c) and the downwards-facing surface of shelf 110(b). Relatedly, shelf 110(b) may have a shelf space bounded by the upwards-facing surface of shelf 110(b) and the downwards-facing surface of shelf 110(a). Relatedly, shelf 110(a) may have a shelf space bounded by the upwards-facing surface of shelf 110(a) and the downwards-facing surface of the top plane/structure of retail shelving unit 100.

As depicted, retail shelving unit 100 holds items of on-shelf merchandise 120. As depicted, items of on-shelf merchandise are often closely-positioned in retail environments. This shelving arrangement is susceptible to "sweeping theft" where perpetrators may be able to remove a large number of merchandise items from a shelf (see e.g., swept-off merchandise 130) in a single sweeping hand movement.

The following description utilizes an exemplary retail environment in describing various features and functionality of embodiments of the disclosed technology. Such description should be taken by way of example and not by way of limitation. Indeed, the anti-theft shelving units/systems disclosed herein can be utilized in various retail environments, including but not limited to indoor and outdoor retail facilities, point of purchase displays, trade show or exhibit displays, and other similar or dissimilar environments.

Figure 2:
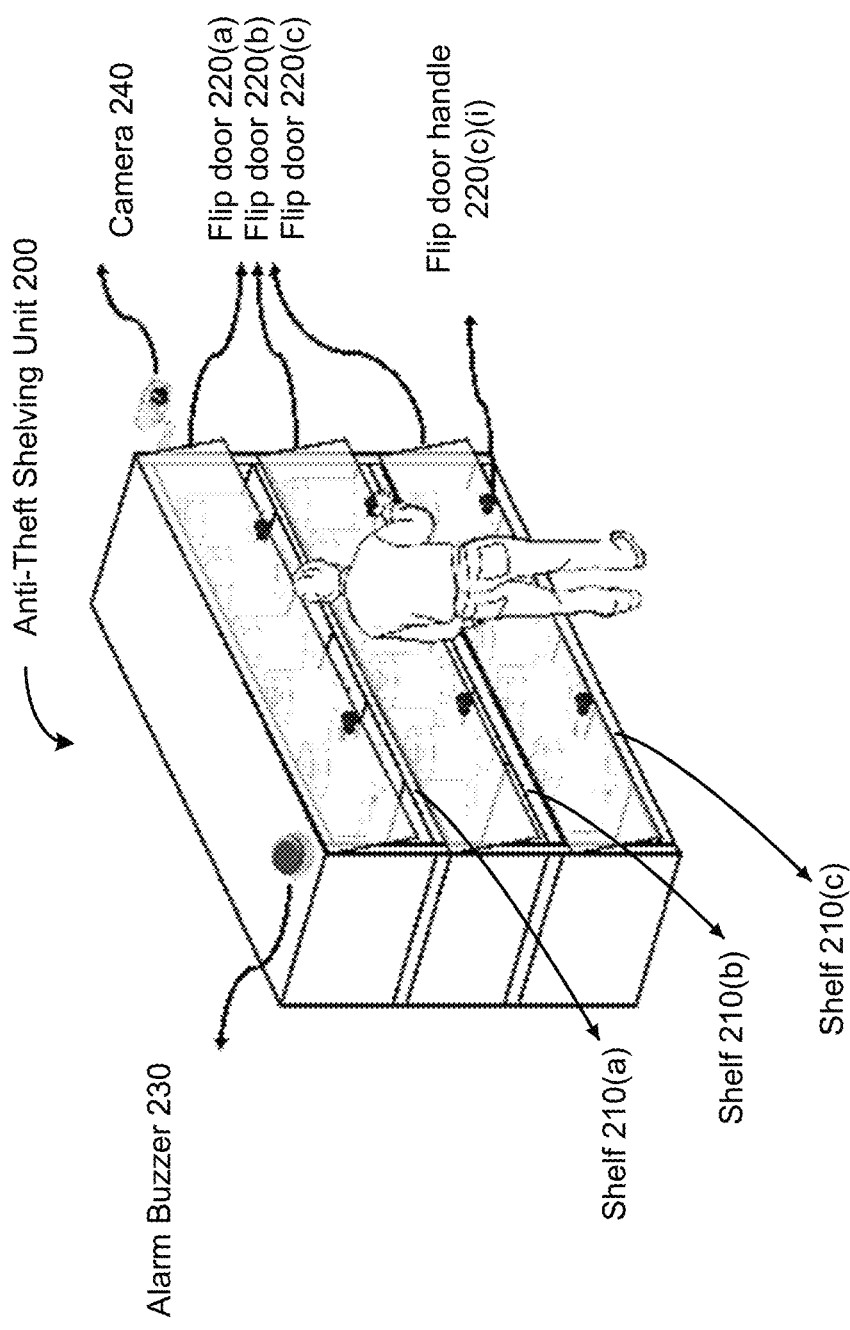
FIG. 2 depicts an example anti-theft shelving unit, in accordance with various embodiments.

FIG. 2 depicts an example anti-theft shelving unit 200, in accordance with various embodiments. Like retail shelving unit 100, anti-theft shelving unit 200 comprises three shelves: shelves 210(a)-(c).

Anti-theft shelving unit 200 also includes flip-doors 220 (a)-(c) swingably-mounted (i.e., mounted via a hinge, or similar mechanism, such that the flip-doors swing about an axis) to anti-theft shelving unit 200. In particular: flip-door 220(a) is swingably-mounted proximate to the top boundary of shelf 210(a)'s shelf space (i.e., the axis about which flip-door 220(a) rotates is located proximate to the top boundary of shelf 210(a)'s shelf space); flip-door 220(b) is swingably-mounted proximate to the top boundary of shelf 210(b)'s shelf space (i.e., the axis about which flip-door 220(b) rotates is located proximate to the top boundary of shelf 210(b)'s shelf space); and flip-door 220(c) is swingably-mounted proximate to the top boundary of shelf 210(c)'s shelf space (i.e., the axis about which flip-door 220(c) rotates is located proximate to the top boundary of shelf 210(c)'s shelf space).

Flip-doors 220(a)-(c) may be configured to allow a customer to see, select, purchase, and remove merchandise from anti-theft shelving unit 200. As alluded to above, flip-doors 220(a)-(c) may be designed to necessitate a multi-step/multi-hand movement process for removing merchandise from a shelf. For example, to remove merchandise from shelf 210(c), the customer may have to first lift flip-door 220(c) with the help of flip-door handle 220(c)(i). While holding flip-door 220(c) open, the customer may have to use another other hand/hand movement to remove merchandise from the shelf. Again, this multi-step/multi-hand movement merchandise-removal process can deter single-movement sweeping actions.

As alluded to above, and as is described in greater detail below, anti-theft shelving unit 200 can automatically control (e.g., open, close, lock, etc.) flip-doors 220(a)-(c) via in-built processing circuitry, motors, gears, etc. (see e.g., anti-theft controller 510 of FIG. 5). For example, anti-theft shelving unit 200 can automatically close flip-doors 220(a)-(c) and lock them in a fixed (closed) position that restricts access to shelves 210(a)-(c). As alluded to above, anti-theft shelving unit 200 may close/lock the flip-doors in response to an anti-theft-related signal (i.e., a signal intending to trigger anti-theft-related mechanisms).

In various embodiment, flip-doors 220(a)-(c) can be controlled (e.g., opened, closed, locked, etc.) with a remote access device. For example, if a sweeping theft is detected, retail employees or customers can close/lock flip-doors 220(a)-(c) with a remote access device. Once closed and locked, flip-doors 220(a)-(c) may restrict access to shelves 210(a)-(c). When the threat of sweeping theft has dissipated (e.g., a perpetrator has been removed from the store), flip-doors 220(a)-(c) may be opened/unlocked automatically using the remote access device. Accordingly, customers may be able to manually access shelves 210(a)-(c) by swinging/lifting flip-doors 220(a)-(c).

As depicted, anti-theft shelving unit 200 may also include a camera 240. Camera 240 may be communicatively coupled to a video analytics system that analyzes video of anti-theft shelving unit 200 and generates an anti-theft-related signal. In some embodiments, processing circuitry of anti-theft shelving unit 200 may: (a) analyze video of anti-theft shelving unit 200 obtained by the camera 240; (b) based on analyzing the video, determine the occurrence of sweeping theft; and (c) generate the anti-theft-related signal.

In some embodiments, camera 240 may communicate with a closed circuit security system (e.g., CCTV). The closed circuit security system may include additional cameras (i.e., in addition to camera 240) that detect theft and send anti-theft-related signals to anti-theft shelving unit 200. For example, video feeds from camera 240 may be sent to the closed circuit security system. Artificial intelligence (AI) and video analytics technology associated with the closed circuit security system may interpret the video feeds and generate anti-theft-related signals when theft is detected. As alluded to above, in response to receiving (or generating) an anti-theft-related signal, anti-theft shelving unit 200 can lock flip-doors 220(a)-(c) in fixed positions that restrict access to shelves 210(a)-(c).

As depicted, in certain embodiments anti-theft shelving unit 200 may also include a mounted alarm buzzer 230. Accordingly, in response to an anti-theft-related signal, anti-theft shelving unit 200 may trigger/activate alarm buzzer 230 in addition to, or in alternative to, locking flip-doors 220(a)-(c).

It should be understood that anti-theft shelving unit 200 merely provides an illustrative example of an anti-theft shelving unit of the disclosed technology. That is, implementational details may vary by application. For example, while only a single flip-door is associated with a given shelf in the specific example of FIG. 2, in various embodiments multiple flip-doors may be associated with a shelf (e.g., two or more adjacently arranged flip-doors). As another example, the orientation for swingable-mounting of the flip-doors can vary across applications. For example, a flip-door may be swingably-mounted proximate to a bottom boundary of a shelf's shelf space (i.e., the axis about which the flip-door swings may be located proximate to the bottom boundary of the shelf's shelf space). In these examples, a customer may open the flip-door by pulling downwards on a door-handle of the flip-door instead of upwards. As another example, the flip-doors may be spring-loaded such that by their mechanical construction/attachment they "automatically" return to a closed position when pulling-forces from a customer are removed.

Figure 3:
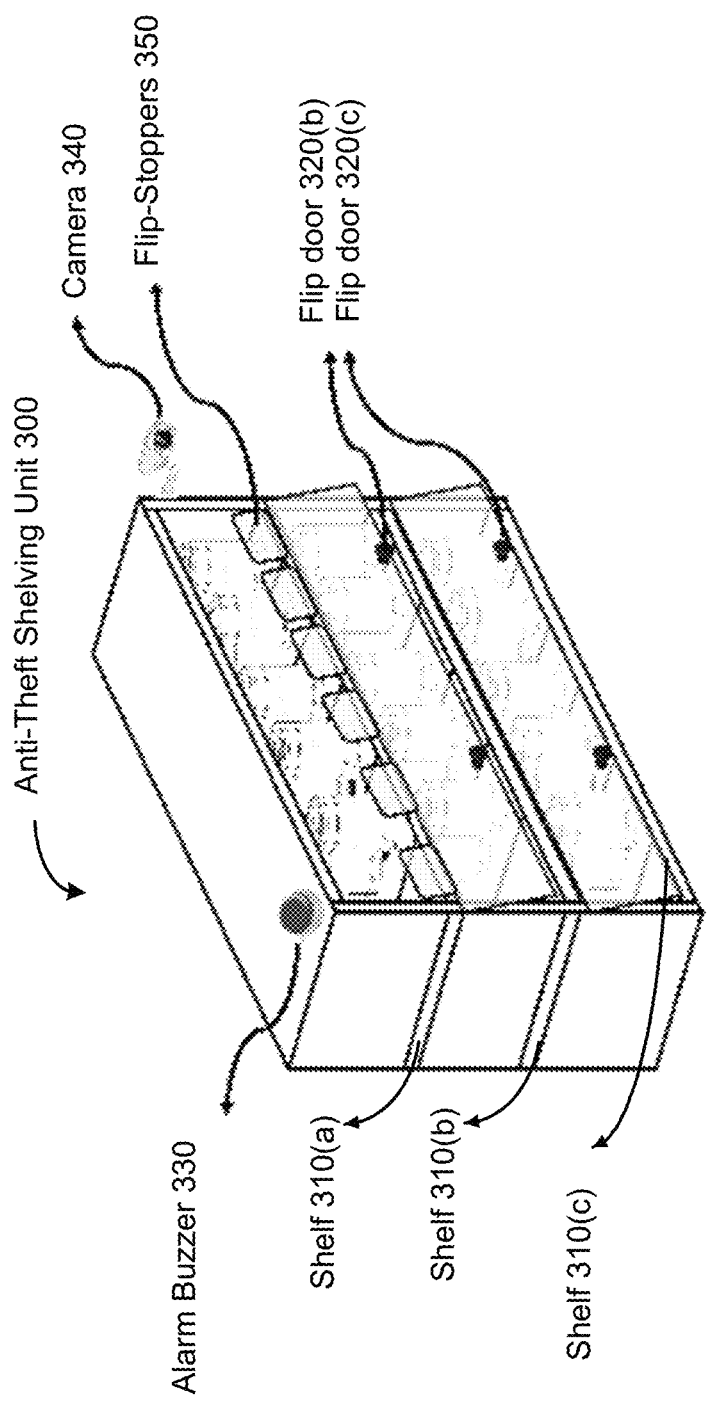
FIG. 3 depicts another example anti-theft shelving unit, in accordance with various embodiments.

FIG. 3 depicts an example anti-theft shelving unit 300, in accordance with various embodiments. As depicted, anti-theft shelving unit 300 may have the same/similar anti-theft features as anti-theft shelving unit 200 with the addition of flip-stoppers 350 swingably-mounted to shelf 310(a). Features already described in conjunction with anti-theft shelving unit 200 will not be described here for the sake of brevity.

As depicted, a flip-stopper of the disclosed technology may be swingably-mounted to an upwards-facing surface of a shelf (i.e., the axis about which the flip-stopper rotates may be located proximate to the upwards-facing surface of the shelf). In a closed position, the flip-stopper may extend upwards from the upwards-facing surface of the shelf such that the flip-stopper restricts access to one or more items of merchandise located on the shelf behind the flip-stopper. In an open position, the flip-stopper may be swung downwards such that it lies approximately horizontally on the upwards-facing surface of a shelf—thereby allowing improved access to items on the shelf located behind the flip-stopper. In various embodiments, the flip-stopper may be spring-loaded such that the flip-stopper returns to the closed (upright) position when manual pressure is removed.

As alluded to above, flip-stoppers 350 may be designed to necessitate a multi-step/multi-hand movement process for removing merchandise from a shelf. For example, to remove an item of merchandise from shelf 310(a), a customer may have to first swing/push a flip-stopper down from the upright (closed) position to a down (open) position where the flip-stopper lies approximately flat on the upwards-facing surface of the shelf. Then, to remove an item of merchandise on the shelf, the customer may need to hold the flip-stopper down (as alluded to above, the flip-stopper may be spring-loaded such that the flip-stopper returns to the closed (upright) position when manual pressure is removed) with one hand/hand movement, while removing the item of merchandise from the shelf with another hand/hand movement. Again, this multi-step/multi-hand movement merchandise-removal process can deter single-movement sweeping actions.

As alluded to above, and as is described in greater detail below, anti-theft shelving unit 300 can automatically control (e.g., open, close, lock, etc.) flip-stoppers 350 via in-built processing circuitry, motors, gears, etc. (see e.g., anti-theft controller 510 of FIG. 5). For example, anti-theft shelving unit 300 can automatically close flip-stoppers 350 and lock them in a fixed, upright position that restricts access to shelf 310(a). As alluded to above, anti-theft shelving unit 300 may close/lock flip-stoppers 350 in response to an anti-theft-related signal (i.e., a signal intending to trigger anti-theft-related mechanisms).

In various embodiments, flip-stoppers 350 can be controlled (e.g., opened, closed, locked, etc.) with a remote access device. For example, if a sweeping theft is detected, retail employees or customers can close/lock flip-stoppers 350 with a remote access device. Once closed and locked, flip-stoppers 350 may restrict access to shelf 310(a). When the threat of sweeping theft has dissipated (e.g., a perpetrator has been removed from the store), flip-stoppers 350 may be opened/unlocked automatically using the remote access device. Accordingly, customers may be able to manually access shelf 310(a) by swinging/pushing flip-stoppers 350 downwards.

It should be understood that anti-theft shelving unit 300 merely provides an illustrative example of an anti-theft shelving unit of the disclosed technology. That is, implementational details may vary by application. For example, while flip-stoppers are only mounted to a single shelf (i.e., shelf 310(a)) in the specific example of FIG. 3, in various embodiments flip-stoppers may be mounted to multiple shelves of an anti-theft shelving unit. Relatedly, in various embodiments a flip-door and flip-stoppers may provide combined protection for a shelf. For example, a flip-door could be swingably-mounted proximate to the top boundary of shelf 310(a)'s shelf space. Accordingly, flip-stoppers 350 may be swingably-mounted to the upwards-facing surface of shelf 310(a) such that the flip-door can close in front of them. As another example, instead of being swingably-mounted to the upwards-facing surface of a shelf, flip-stoppers may be swingably-mounted to a top boundary of a shelf's shelf-space. For example, flip-stoppers designed to restrict access to shelf 310(b) may be swingably-mounted to the downwards-facing surface of shelf 310(a) (i.e., the top boundary of shelf 310(b)'s shelf space). In still further examples, instead of being swingably-mounted to a shelf, a flip-stopper may be slidably mounted to a shelf such that in a closed position the flip-stopper extends upwards from the upwards-facing surface of the shelf, whereas in an open position the flip-stopper is pushed linearly downwards into a recess of the shelf—thereby allowing access to items located behind the flip-stopper.

Figure 4:
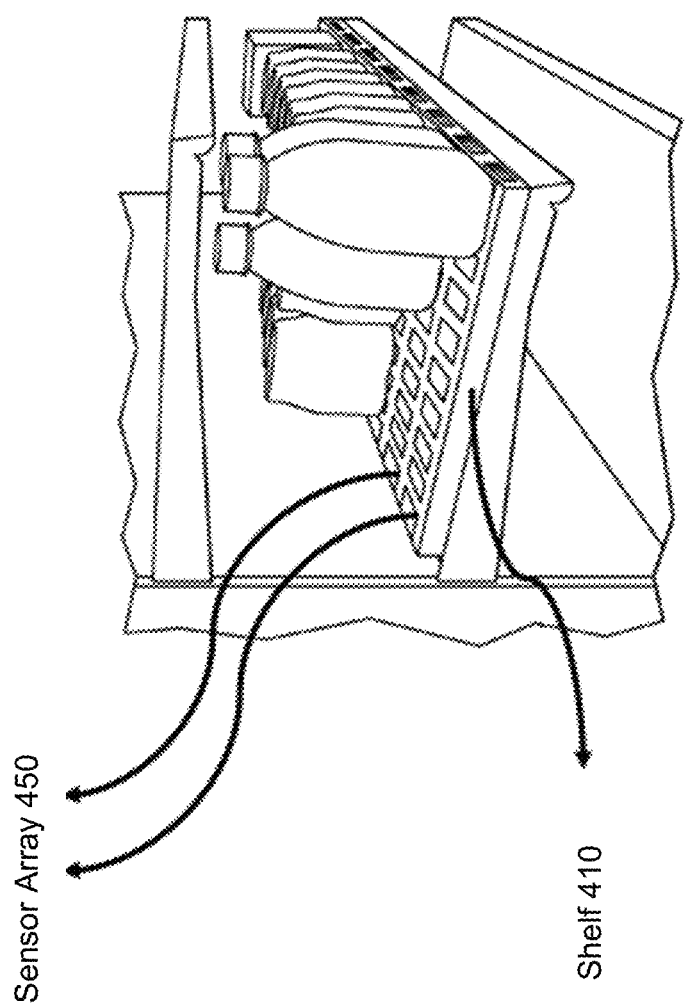
FIG. 4 depicts an array of sensors arranged on a shelf of an example anti-theft shelving unit, in accordance with various embodiments.

FIG. 4 depicts an array of sensors 450 arranged on a shelf 410 of an example anti-theft shelving unit, in accordance with various embodiments.

As alluded to above, an anti-theft shelving unit may comprise an array of sensors (e.g., sensor array 450) arranged on a shelf (e.g., shelf 410) to detect removal of items from the shelf. In these embodiments, the anti-theft shelving unit (or more particularly, processing circuitry of the anti-theft shelving unit) can: (a) detect, via the array of sensors, removal of items from the shelf; (b) based on the detected removal of items from the shelf, determine occurrence of sweeping theft; and (c) generate the anti-theft-related signal. In certain embodiments, determining the occurrence of sweeping theft based on the detected removal of items from the shelf may comprise: (i) detecting removal of over a threshold number of items (this threshold number of items can be custom-configurable based on application) in a pre-determined time interval (this time interval can also be custom-configurable based on application); and (ii) based on detecting removal of over the threshold number of items in the pre-determined time interval, determining the occurrence of sweeping theft.

Referring again to FIG. 4, sensor array 450 may be an array of one or more sensors. The sensors of sensor array 450 may be mounted in close proximity on the shelf 410. As alluded to above, the sensors can detect presence of items of merchandise placed on shelf 410. For example, such sensors can detect object proximity. If an item of merchandise is placed on a particular sensor of sensor array 450, the status of the sensor may be returned as detected. When no item of merchandise is placed on top of the sensor, the status of the sensor may be returned as undetected. By analyzing the status of the sensors of sensor array 450, the status of shelf 410 can be determined as empty or filled with items of merchandise. As alluded to above, a further analysis of the status of sensor array 450 within a certain time frame can determine whether items of merchandise are being "swept off" shelf 410.

Figure 5:
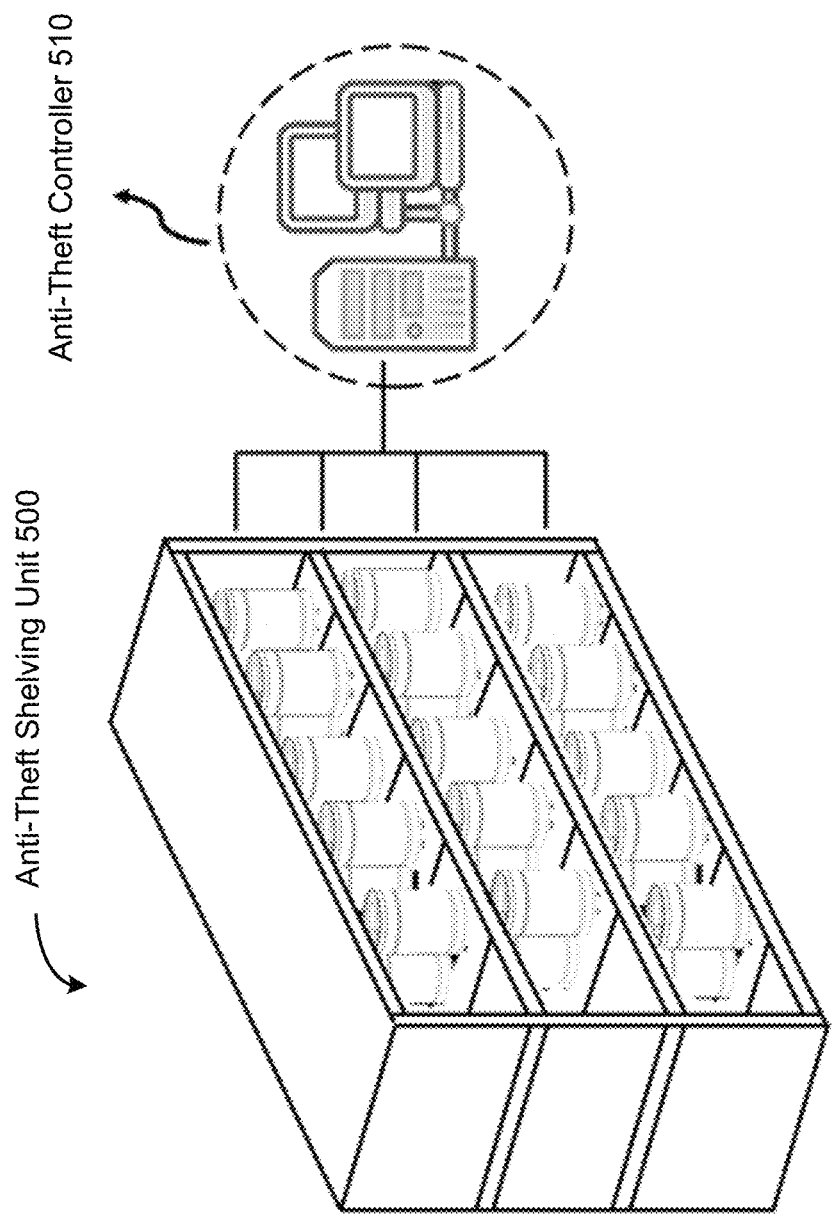
FIG. 5 depicts another example anti-theft shelving unit, in accordance with various embodiments.

FIG. 5 depicts an example anti-theft shelving unit 500, in accordance with various embodiments. As depicted, anti-theft shelving unit 500 includes an anti-theft controller 510. In various embodiments, anti-theft controller 510 may be physically located on anti-theft shelving unit 500, however in other embodiments anti-theft controller 510 may be located/implemented partially or completely remotely.

As alluded to above, anti-theft controller 510 can be operatively/communicatively connected to various anti-theft features of anti-theft shelving unit 500 (e.g., flip-doors, flip-stoppers, cameras, alarm buzzers, sensors, etc.). As is described in greater detail in conjunction with FIG. 7, anti-theft controller 510 may include server(s), computer(s), storage memory(s) and electronic communication peripheral(s), etc. Accordingly, anti-theft controller 510 can analyze the status of sensors and respond to the outcome, control the mode of the flip-doors and flip-stoppers, manage alarm buzzers, communicate and exchange data with other electronic systems connected to anti-theft shelving unit 500, etc.

Figure 6:
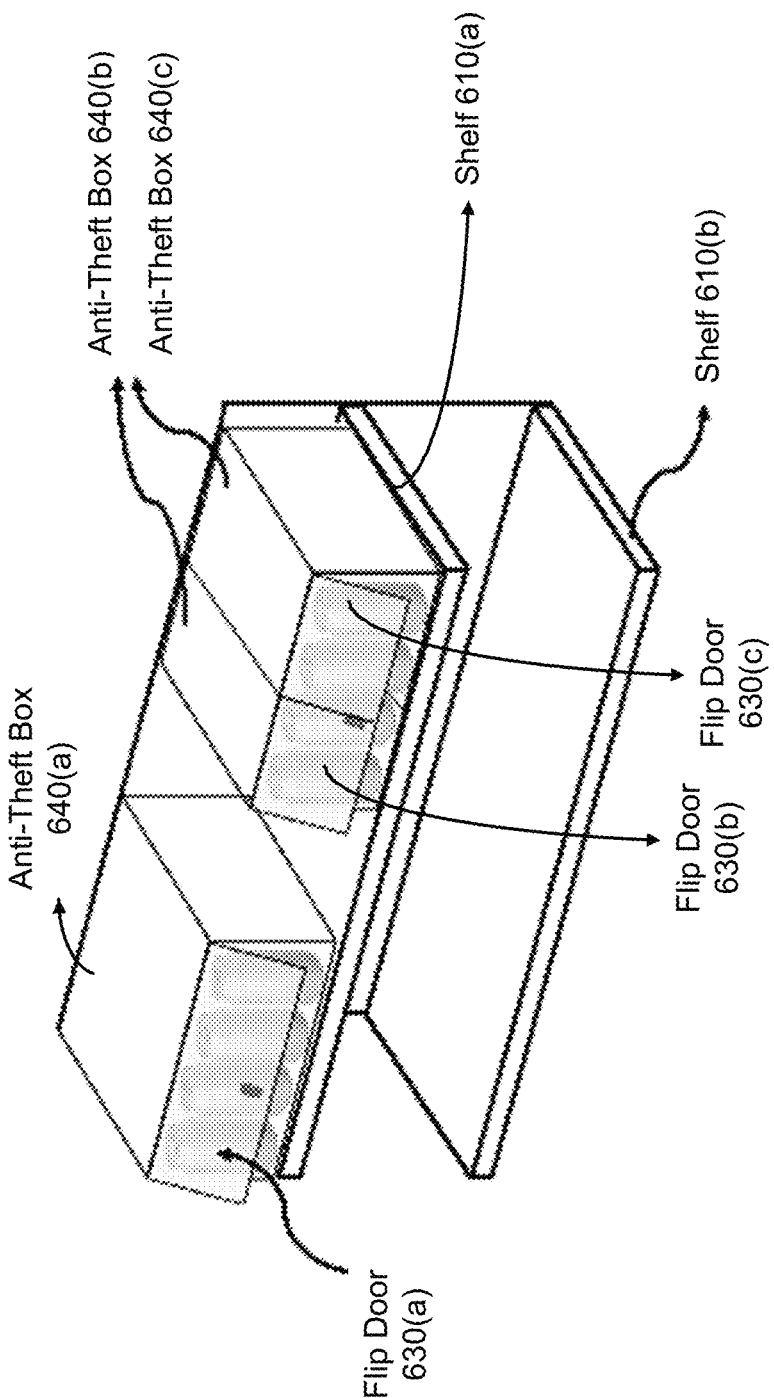
FIG. 6 depicts example anti-theft boxes, in accordance with various embodiments.

FIG. 6 depicts example anti-theft boxes, in accordance with various embodiments.

In certain cases, a retailer may want to protect select high value merchandise. To address this need/desire, the disclosed technology provides anti-theft boxes (e.g., anti-theft boxes 640(a)-(c)) into which select high value merchandise can be placed. As depicted, anti-theft boxes of the disclosed technology can be removably or permanently mounted to existing retail shelves (e.g., shelf 610(a)). While anti-theft boxes 640(a)-(c) are mounted to the top of shelf 610(a) in the example of FIG. 6, in other examples anti-theft boxes 640(a)-(c) may be mounted to a bottom of a shelf.

Anti-theft boxes 640(a)-(c) may have the same/similar anti-theft design features as the anti-theft shelving units described in the previous figures. For example, anti-theft boxes 640(*a*)-(*c*) may include: (1) swingably-mounted flip-stopper(s); (2) swingably-mounted flip-door(s) (e.g., flip-doors 630(*a*)-(*c*)); (3) processing circuitry that, in response to an anti-theft-related signal, locks the flip-stopper(s) and flip-door(s) in fixed positions that restrict access to items in the anti-theft boxes; and (4) sensors and processing circuitry that determine occurrence of sweeping theft in response to detecting removal of over a threshold number of items from an anti-theft box in a pre-determined time interval. In various examples, a flip-stopper may be swingably-mounted to an upwards-facing surface at the base of the anti-theft box. In certain examples, a flip-door may be swingably-mounted to a roof of an anti-theft box such that the flip-door hangs down and covers a customer-facing opening of the anti-theft box when the flip-door is in a closed position (see e.g., flip-doors 630(*a*)-(*c*) swingably-mounted to rooves of anti-theft boxes 640(*a*)-(*c*) respectively such that flip-doors 630(*a*)-(*c*) hang down and cover customer-facing openings of anti-theft boxes 640(*a*)-(*c*) when flip-doors 630(*a*)-(*c*) are in a closed position).

As depicted, anti-theft boxes 640(*a*)-(*c*) may come in different sizes to accommodate different sizes/amounts of merchandise. In various embodiments, anti-theft boxes 640(*a*)-(*c*) may be interlocked/connected together as well. For example, anti-theft boxes 640(*b*) and 640(*c*) may be interlocked/connected together to accommodate a larger amount of related/closely-located merchandise.

Figure 7:
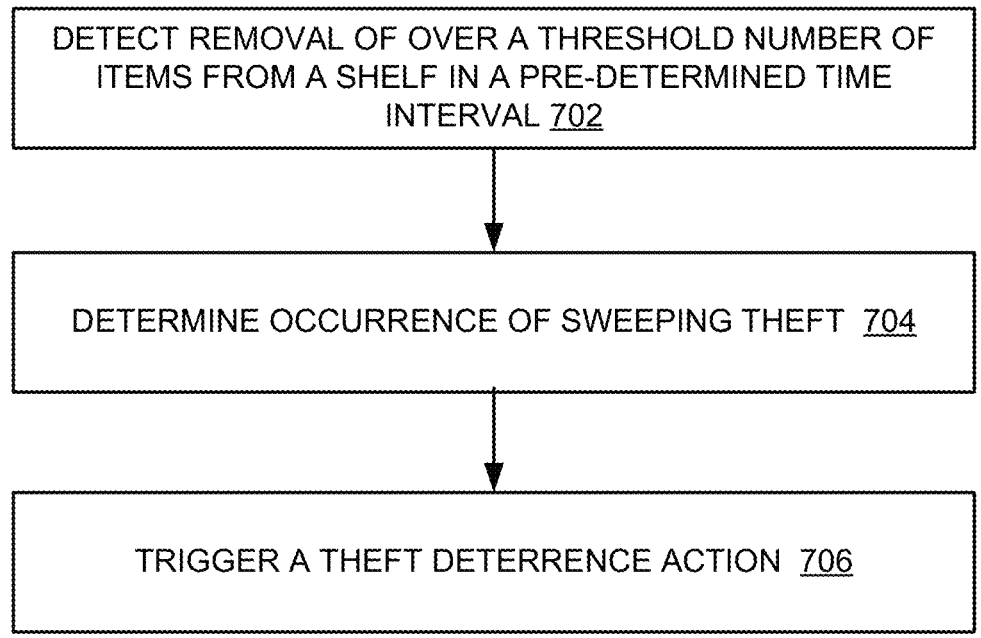
FIG. 7 is an example flow diagram illustrating an example process for sweeping-theft detection and deterrence, in accordance with various embodiments.

FIG. 7 is an example flow diagram illustrating an example process that can be performed by an anti-theft shelving system to detect and deter sweeping-theft, in accordance with various embodiments. The example process of FIG. 7 may be implemented by anti-theft controller 510.

At operation 710, the anti-theft shelving system detects removal of over a threshold number of items from a shelf in a pre-determined time interval. As alluded to above, the threshold number of items and the pre-determined time interval can be custom-configurable based on application. For example, for a given retailer, removal of over 8 items from a shelf in a time interval of 5 seconds may be indicative of sweeping theft. Accordingly, the threshold number of items may be 8, and the pre-determined time interval may be 5 seconds. If the anti-theft shelving system detects that 12 items were removed from the shelf in 5 seconds (i.e., over the threshold number of items in the pre-determined time interval), that would indicate/suggest the occurrence of sweeping theft.

At operation 704, based on detecting removal of over the threshold number of items in the pre-determined time interval, the anti-theft shelving system determines the occurrence of sweeping theft.

At operation 706, the anti-theft shelving system triggers a theft deterrence action. Examples of theft deterrence action may include, closing/locking flip-doors of an anti-theft shelving unit associated with the shelf, closing/locking flip-stoppers of the anti-theft shelving unit, activating an alarm buzzer, etc.

Figure 8:
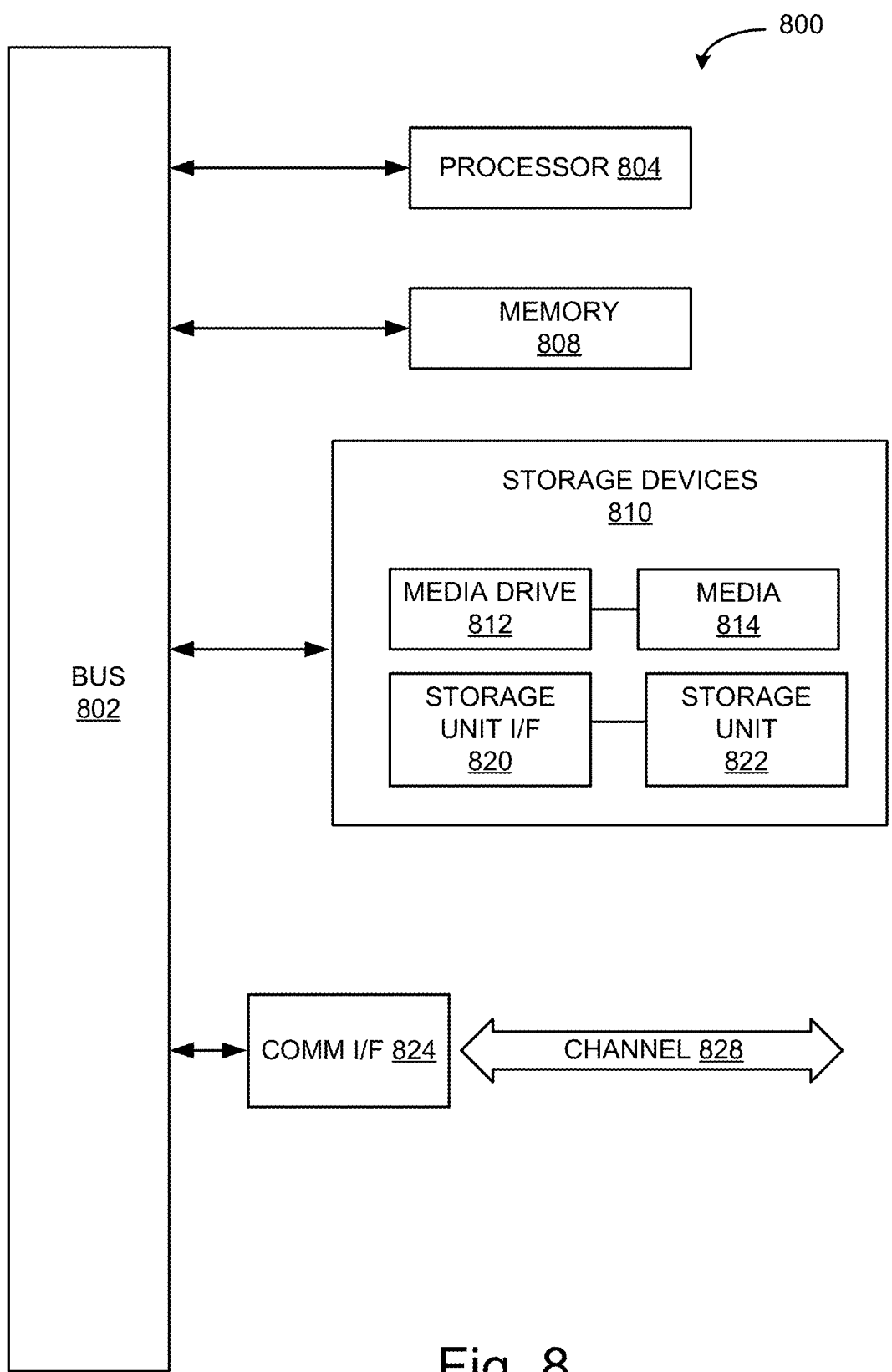
FIG. 8 is an example computing component that may be used to implement various features of embodiments described in the present disclosure.

As used herein, the term module may be used describe a given unit of functionality that can be performed in accordance with one or more embodiments of the disclosed application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. Various components described herein may be implemented as discrete module or described functions and features can be shared in part or in total among one or more modules. In other words, as would be apparent to one of ordinary skill in the art after reading this description, the various features and functionality described herein may be implemented in any given application. They can be implemented in one or more separate or shared modules in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where modules are implemented in whole or in part using software, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An anti-theft shelving unit comprising:
   a flip-stopper swingably-mounted to a shelf of the anti-theft shelving unit;
   non-transitory memory configured to store instructions; and
   one or more processors configured to execute the instructions to perform operations of:
      in response to an anti-theft-related signal, locking the flip-stopper in a position extending upwards from the shelf such that access to an item on the shelf behind the flip-stopper is restricted;
   wherein the flip-stopper automatically returns to the position extending upwards from the shelf when manual pressure pushing the flip-stopper downwards is removed.

2. The anti-theft shelving unit of claim 1, further comprising a flip-door swingably-mounted to the anti-theft shelving unit, wherein the operations further comprise:
   in response to the anti-theft-related signal, locking the flip-door in a closed position such that access to items on the shelf is restricted.

3. The anti-theft shelving unit of claim 1, wherein the anti-theft-related signal is generated by a remotely located device communicatively connected to the anti-theft shelving unit.

4. The anti-theft shelving unit of claim 1, further comprising an array of sensors arranged on the shelf to detect removal of items from the shelf.

5. The anti-theft shelving unit of claim 4, wherein the operations further comprise:
   detecting, via the array of sensors, removal of items from the shelf;
   based on the detected removal of items from the shelf, determining occurrence of sweeping theft; and
   generating the anti-theft-related signal.

6. The anti-theft shelving unit of claim 5, wherein determining the occurrence of sweeping theft based on the detected removal of items from the shelf comprises:
   detecting removal of over a threshold number of items in a pre-determined time interval; and
   based on detecting removal of over the threshold number of items in the pre-determined time interval, determining the occurrence of sweeping theft.

7. The anti-theft shelving unit of claim 1, further comprising a camera mounted to the anti-theft shelving unit.

8. The anti-theft shelving unit of claim 7, wherein the camera is communicatively coupled to a video analytics system that analyzes video of the anti-theft shelving unit and generates the anti-theft-related signal.

9. The anti-theft shelving unit of claim 1, further comprising an alarm buzzer mounted on the anti-theft shelving unit, wherein the operations further comprise:
   in response to the anti-theft-related signal, activating the alarm buzzer.

10. The anti-theft shelving unit of claim 7, wherein the operations further comprise:
    analyzing video of the anti-theft shelving unit obtained by the camera;
    based on analyzing the video, determining the occurrence of sweeping theft; and
    generating the anti-theft-related signal.

11. The anti-theft shelving unit of claim 1, wherein the flip-stopper is spring-loaded such that the flip-stopper automatically returns to the position extending upwards from the shelf when manual pressure pushing the flip-stopper downwards is removed.

12. An anti-theft shelving unit comprising:
    a barrier mounted to the anti-theft shelving unit;
    non-transitory memory configured to store instructions; and
    one or more processors configured to execute the instructions to perform operations of:
        based on detecting removal of over a threshold number of items from the anti-theft shelving unit in a pre-determined time interval, determining the occurrence of sweeping theft and generating an anti-theft-related signal; and
        in response to the anti-theft-related signal, locking the barrier in a closed position that restricts access to items on a shelf of the anti-theft shelving unit.

13. The anti-theft shelving unit of claim 12, further comprising a flip-stopper swingably-mounted to the shelf, wherein the operations further comprise:
    in response to the anti-theft-related signal, locking the flip-stopper in a fixed position extending upwards from the shelf such that access to an item on the shelf behind the flip-stopper is restricted.

14. The anti-theft shelving unit of claim 12, further comprising an array of sensors arranged on the shelf that detect the removal of over the threshold number of items in the pre-determined time interval.

15. The anti-theft shelving unit of claim 12, further comprising an alarm buzzer that is triggered in response to the anti-theft-related signal.

16. An anti-theft box comprising:
    a flip-stopper swingably-mounted to an upwards-facing surface at a base of the anti-theft box;
    non-transitory memory configured to store instructions; and
    one or more processors configured to execute the instructions to perform operations of:
        in response to an anti-theft-related signal, locking the flip-stopper in a position extending upwards from the base of the anti-theft box such that access to an item in the anti-theft box behind the flip-stopper is restricted;
    wherein the flip-stopper automatically returns to the position extending upwards from the shelf when manual pressure pushing the flip-stopper downwards is removed.

17. The anti-theft box of claim 16, wherein the anti-theft-box is configured to be mounted to a shelf.

18. The anti-theft box of claim 17, wherein the anti-theft-box is configured to be interlocked with a second anti-theft box when mounted to the shelf.

19. The anti-theft box of claim 16, further comprising a flip-door swingably-mounted to a roof of the anti-theft box, wherein the operations further comprise:
    in response to the anti-theft-related signal, locking the flip-door in a closed position such that access to items in the anti-theft box is restricted.

20. The anti-theft box of claim 16, wherein the anti-theft-related signal is generated by a remotely located device communicatively connected to the anti-theft box.

\* \* \* \* \*